United States Patent
Iwase et al.

(10) Patent No.: US 7,188,593 B2
(45) Date of Patent: Mar. 13, 2007

(54) CONTROLLER FOR AUTOMOBILE

(75) Inventors: Noriaki Iwase, Obu (JP); Haruyuki Urushihata, Chiryu (JP); Hisashi Iida, Kariya (JP)

(73) Assignee: Denso Corporation, Aichi-Pref (JP)

( * ) Notice: Subject to any disclaimer, the term of this patent is extended or adjusted under 35 U.S.C. 154(b) by 113 days.

(21) Appl. No.: 11/129,484

(22) Filed: May 16, 2005

(65) Prior Publication Data

US 2006/0075981 A1   Apr. 13, 2006

(30) Foreign Application Priority Data

May 19, 2004   (JP)   ............................. 2004-148481

(51) Int. Cl.
*F01L 1/34*   (2006.01)

(52) U.S. Cl. ............................. 123/90.15; 123/90.17; 123/90.16; 123/90.31

(58) Field of Classification Search ............. 123/90.15, 123/90.16, 90.17, 90.31
See application file for complete search history.

(56) References Cited

U.S. PATENT DOCUMENTS 6,386,158 B1 * 5/2002 Takahashi ................ 123/90.15

FOREIGN PATENT DOCUMENTS

JP   07-119501   5/1995
JP   09-256878   9/1997

* cited by examiner

*Primary Examiner*—Thomas Denion
*Assistant Examiner*—Zelalem Eshete
(74) *Attorney, Agent, or Firm*—Nixon & Vanderhye P.C.

(57) ABSTRACT

A control duty is obtained, which asymptotically makes the output of a control subject consistent with an output of a reference model. The output of the control subject simulates a dynamic characteristic of a variable valve timing controller, and the output of the reference model simulates an ideal input-output characteristic of the variable valve timing. The control duty makes a difference between the output of the reference model and an actual valve timing small enough. A parameter of a controller is consecutively corrected to make the difference small by means of a parameter correcting mechanism when the dynamic characteristic of the variable valve timing controller is varied due to a variation of an operating environment thereof so that the difference becomes large.

10 Claims, 9 Drawing Sheets

CONTROLLER FOR AUTOMOBILE

CROSS REFERENCE TO RELATED APPLICATIONS

This application is based on Japanese Patent Application No. 2004-148481 filed on May 19, 2004, the disclosure of which is incorporated herein by reference.

FIELD OF THE INVENTION

The present invention relates to a controller for an automobile, which calculates an input to a control subject based on a target value using a model of the control subject.

BACKGROUND OF THE INVENTION

Recently, an internal combustion engine mounted on a vehicle is provided with a variable valve timing controller which adjusts opening/closing timing of an intake valve and/or an exhaust valve by a hydraulic pressure in order to improve an output and a fuel economy and to reduce an emission. In such a variable valve timing controller driven by the hydraulic pressure, since the viscosity of the operating oil is changed according to an oil temperature to vary a flowability thereof, a response of the valve timing controller (valve timing changing speed) is varied due to the oil temperature.

An input to a hydraulic pressure control valve of the variable valve timing controller is corrected based on the oil temperature or an engine coolant temperature (information representing the oil temperature), so that the variation in response of the variable valve timing controller due to the variation in the oil temperature is compensated.

However, it is difficult to accurately estimate the variation in viscosity of the operating oil based on the oil temperature or the engine coolant temperature. The response of the variable valve timing controller is also varied due to a production dispersion and an aging thereof. Thus, even if the input to the hydraulic pressure control valve is corrected based on the oil temperature or the engine coolant temperature, the variation in response of the variable valve timing controller cannot be accurately compensated.

Taking measures against above problems, Japanese Patent No. 3134763 shows a variable valve timing controller in which a speed of variation in valve timing is calculated when a control input (duty ratio) is maintained in a predetermined value in such a manner that the speed of variation in valve timing of the variable valve timing controller is constant. The control input (duty ratio) is corrected in order to reduce a difference between the speed of variation in valve timing and a predetermined reference speed thereof.

However, in this controller, the variation of a behavior (a static characteristic) of the variable valve timing controller is compensated when the control input of the variable valve timing controller (hydraulic pressure control valve) is kept constant. A response characteristic (a dynamic characteristic) relative to the variation in control input of the variable valve timing controller is not considered. The variation in dynamic characteristic due to an operation environment (such as oil temperature), the production disperse, and the aging cannot be compensated, so that a control accuracy of the variable valve controller in transitional period is deteriorated being affected by the operation environment, the production disperse, and the aging.

SUMMARY OF THE INVENTION

The present invention is made in view of the above matters, and it is an object of the present invention to provide a controller for an automobile, which is able to compensate a variation in dynamic characteristic of a control subject due to an operation environment, a production disperse, an aging, and the like, so that a control accuracy of the control subject in transitional period is enhanced.

In order to achieve the above object, a controller for an automobile of the present invention includes a control input calculation means for calculating an input for a control subject from a target value of the control subject by means of a control subject model (a reverse model) simulating a dynamic characteristic of the control subject, a control input detecting means for detecting an output of the control subject; and a parameter correcting means for correcting either a parameter of the control subject model or a parameter of the control input calculation means based on a relationship between the input of the control subject or the target value and an output of the control subject.

According as the dynamic characteristic of the control subject is varied, the relationship between an input and an output of the control subject during a transient period is varied. Since the input of the control subject is calculated from the target value by means of the control subject model (the reverse model), a relationship between the target value and the output of the control subject is varied when the relationship between the input and the output of the control subject is varied due to a variation of the dynamic characteristic of the control subject. Thus, by correcting the parameter of the control subject model or a parameter of the control input calculation means based on a relationship between the input (or target value) and the output of the control subject, the parameter of the control subject model or the parameter of the control input calculation means is corrected to an appropriate value according to the variation of the dynamic characteristic of the control subject. Thus, even if a dynamic characteristic of the control subject is varied due to an operating environment, a production disperse, or an aging, the input of the control subject is automatically corrected according to the variation of the dynamic characteristic of the control subject in order to compensate a variation of the dynamic characteristic of the control subject due to the operating environment, the production disperse, or the aging. Thereby, a controllability of the control subject during a transient period can be stable to enhance a control accuracy of the control subject during the transient period thereof.

BRIEF DESCRIPTION OF THE DRAWINGS

Other objects, features, and advantages of the present invention will become more apparent from the following detailed description made with references to the accompanying drawings, in which like parts are designated by like reference number and in which.

DETAILED DESCRIPTION OF THE PREFERRED EMBODIMENTS

An embodiment of the present invention applied to a variable valve timing controller foe an internal combustion engine will be described hereinafter with reference to the drawings.

Figure 1:
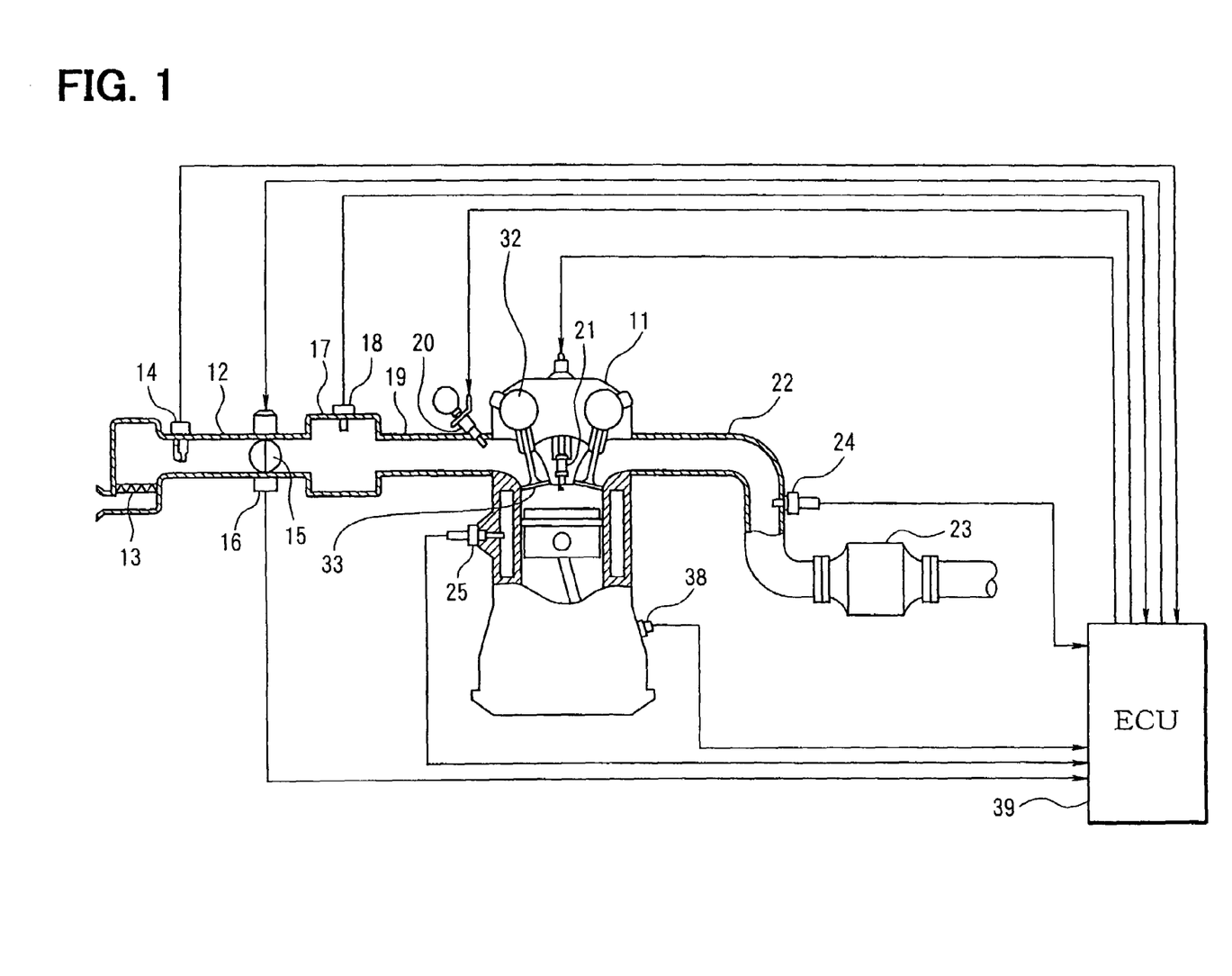
FIG. 1 is a schematic view of an engine control system according to an embodiment of the present invention.

Referring to FIG. 1, a structure of an engine control system is schematically described. An air cleaner 13 is provided at an upstream portion of an intake pipe 12 of an internal combustion engine 11. An air flow meter 14 detecting an intake air flow rate is provided downstream of the air cleaner 13. A throttle valve 15 of which opening degree is adjusted by a DC motor, and a throttle position sensor 16 detecting a throttle position are provided downstream of the air flow meter 14.

A surge tank 17 is provided downstream of the throttle valve 15. An intake air pressure sensor 18 is provided in the surge tank 17. An intake manifold 19 is connected to the surge tank 17 to introduce fresh air into each cylinder of the engine 11. A fuel injector 20 for injecting fuel is respectively mounted on the intake manifold 19 at a vicinity of an intake port of each cylinder. A spark plug 21 in mounted on a cylinder head of the engine 11 corresponding to each cylinder in order to ignite air-fuel mixture in the cylinder.

In an exhaust pipe 22 of the engine 11, a catalyst 23 such as three-way catalyst is provided for purifying CO, HC, NOx, and the like. An exhaust gas sensor 24 (an air-fuel ratio sensor, an $O_2$ sensor, etc.) for detecting an air-fuel ratio or rich/lean in the exhaust gas is provided upstream of the catalyst 23. A coolant temperature sensor 25 for detecting a coolant temperature is provided on a cylinder block of the engine 11.

Figure 2:
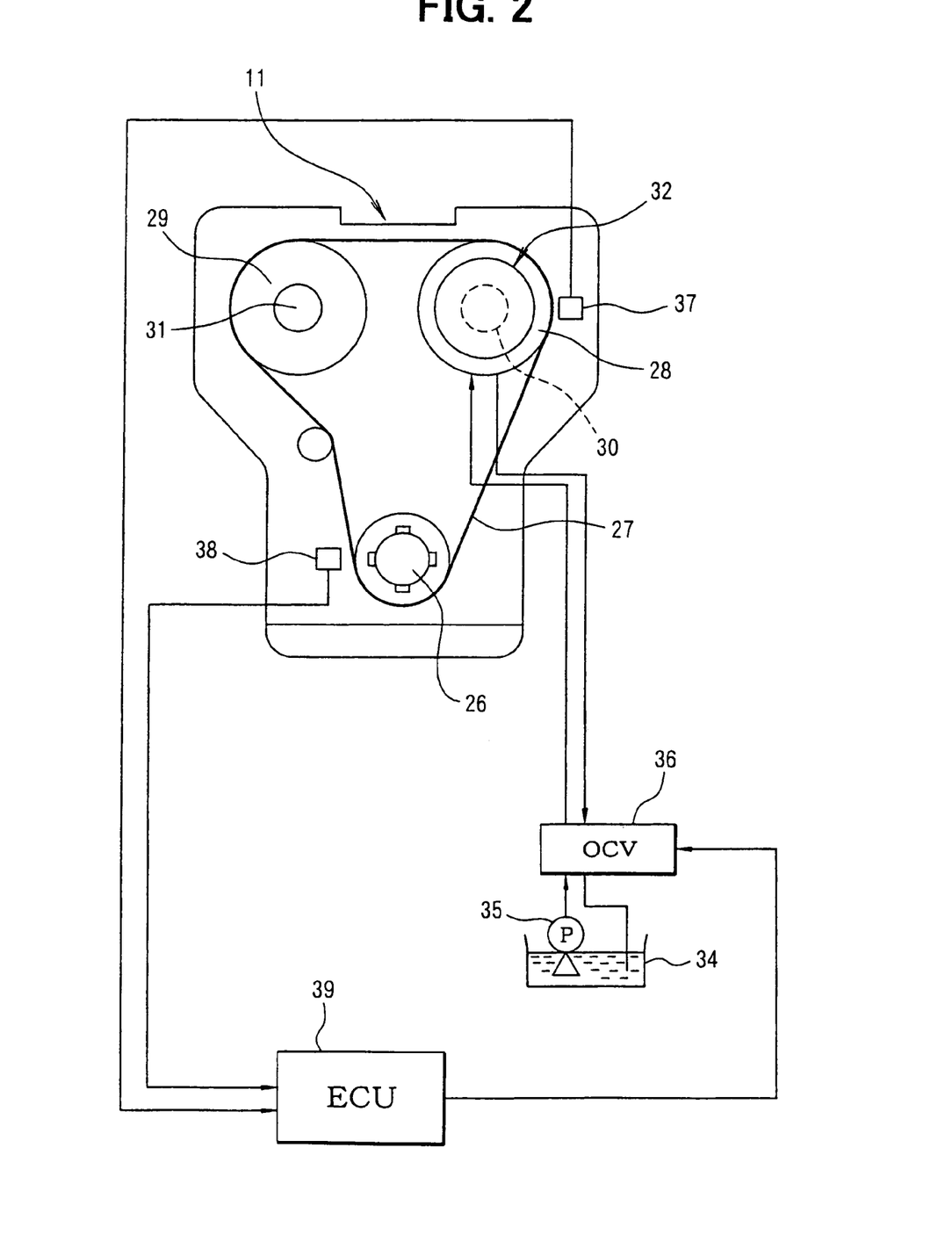
FIG. 2 is a schematic view of a valve timing control system.

As shown in FIG. 2, the engine 11 has a structure in which a driving force from a crankshaft 26 is transmitted to an intake cam shaft 30 and an exhaust camshaft 31 through a timing chain 27 (or timing belt) and each sprocket 28, 29. A variable valve timing controller 32 is provided on the intake camshaft 30. The variable valve timing controller 32 is driven by hydraulic pressure. The variable valve timing controller 32 varies a rotational phase (a cam phase) of the intake camshaft 30 relative to the crankshaft 26, so that a valve timing of the intake valve 33 which is driven by the intake camshaft 30 is adjusted. An operating oil (engine oil) in an oil pan 34 is supplied to a hydraulic pressure circuit of the variable vale timing controller 32 by an oil pump 35. A hydraulic pressure control valve 36 (OCV) controls the hydraulic pressure to control the valve timing of the intake valve 33.

A cam angle sensor 37 outputting a cam angle signal every predetermined cam angle is provided outside of the intake camshaft 30. A crank angle sensor 38 outputting a crank angle signal every predetermined crank angle is provided outside of the crankshaft 26. A crank angle and an engine speed are calculated based on output signals from the crank angle sensor 38. Actual valve timing is calculated based on output signals from the cam angle sensor 37 and the crank angle sensor 38.

The outputs from the above sensors are inputted into an engine control circuit 39, which is referred to as ECU herein after. The ECU 39 includes a microcomputer which executes engine control programs stored in an internal ROM (storage media) in order to control a fuel injection amount of the fuel injector 20 and an ignition timing of the spark plug 21.

The ECU 39 executes each program for valve timing control shown in FIGS. 4 to 9 so that the actual valve timing is calculated based on output signals from the cam angle sensor 37 and the crank angle sensor 38, and a control duty of the variable valve timing controller 32 (the hydraulic pressure control valve 36) is calculated in such a manner as to make the actual valve timing consistent with a target valve timing.

Figure 3:
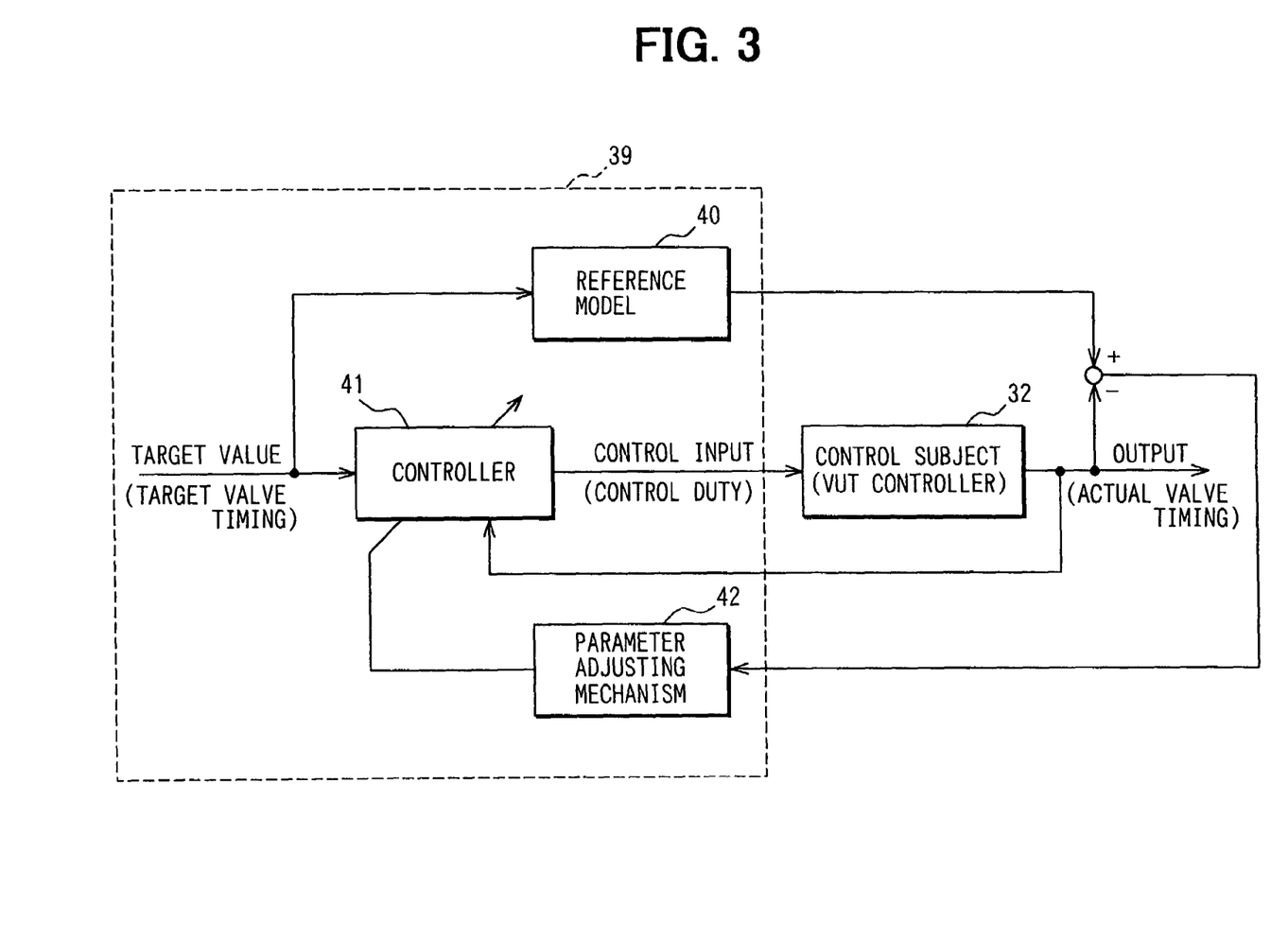
FIG. 3 is a block chart showing functions of a model reference adaptive control.

The ECU 39 executes a model reference adaptive control as shown in FIG. 3. In order to execute the model reference adaptive control, a reference model 40 is established, which simulates an ideal input-output characteristic (a response characteristic) of a control subject 32 (a variable valve timing controller), and a control input (control duty) is calculated so that a difference between an output of the reference model 40 and an output of the control subject 32 (actual valve timing) becomes zero by means of a controller 41 (control input calculating means). When a dynamic characteristic (input-output characteristic) is varied due to a variation in operating environment such as an oil temperature, a difference between the output of the reference model 40 and the output of the control subject 32 becomes larger. A parameter adjusting mechanism 42 (parameter adjusting means) adjusts a parameter of the controller 41 so that the difference becomes small enough (around zero).

A design of the model reference adaptive control is described hereinafter. A control subject model which simulates a dynamic characteristic of the control subject 32 (variable valve timing controller) is established as a linear model expressed by a following equations by means of system identification method.

$$y(k) = z^{-3}\frac{B(z^{-1})}{A(z^{-1})}u(k) \tag{1}$$

$$A(z^{-1}) = 1 + a1z^{-1} = a2z^{-2}$$

$$B(z^{-1}) = b + b1z^{-1}$$

wherein u (k) represents the input (control duty), y (k) represents the output (actual valve timing).

Besides, a1 is a weighting factor for the last output, a2 is a weighting factor for an output before last one, b is a weighting factor for the input, b1 is a weighting factor for the last input. These weighting factors are calculated by means of last squares.

A design of the controller 41 based on the control subject model is described hereinafter.

A reference model 40 which simulates ideal input-output characteristic of the control subject (variable valve timing controller) is established by following equations.

$$ym(k) = z^{-3}\frac{bm + bm1z^{-1} + bm2z^{-2}}{1 + am1z^{-1} + am2z^{-2}}um(k) \tag{2}$$

wherein um (k) represents the input (target valve timing), ym (k) represents the output (actual valve timing). Besides, am1 is a weighting factor for the last output, am2 is a weighting factor for an output before the last output, bm is a weighting factor for the input, bm1 is a weighting factor for the last input, and bm2 is a weighting factor for the input before the last input.

The controller 41 provides a control input u (k) which asymptotically makes the output y (k) of the control subject model shown in the equation (1) consistent with the output ym (k) of the reference model shown in the equation (2). The control input u (k) is represented by following equations.

$$u(k) = \frac{1}{b0}\{D(z^{-1})ym(k) - S(z^{-1})y(k) - BR(z^{-1})u(k)\} \quad (3)$$

$$BR(z^{-1}) = br1z^{-1} + br2z^{-2} + br3z^{-3} + br4z^{-4} \quad (4)$$

$$S(z^{-1}) = s0 + s1z^{-1} + s2z^{-2} \quad (5)$$

wherein b0, br1, br2, br3, br4, s0, s1, s2 are unidentified parameters which are adjusted is such a manner that a difference between the output (actual valve timing) of the control subject 32 and the output ym (k) of the reference model 40 becomes smaller or zero.

The parameter adjusting mechanism 42 is identified by following equations.

$$\theta(k) = \theta(k-1) + \Gamma(k-1)\xi(k-3)\varepsilon(k) \quad (6)$$

$$\Gamma(k) = \frac{1}{\lambda 1(k)}\left(\Gamma(k-1) - \frac{\lambda 2\Gamma(k-1)\xi^\gamma(k-3)\xi(k-3)\Gamma(k-1)}{\lambda 1(k) + \lambda 2(k)\xi^\gamma(k-3)\Gamma(k-1)\xi(k-3)}\right) \quad (7)$$

$$\varepsilon(k) = D(z^{-1})(\hat{y}(k) - y(k)) = \frac{-D(z^{-1})y(k) + \theta^\gamma(k-1)\xi(k-3)}{1 + \xi^\gamma(k-3)\Gamma(k-1)\xi(k-3)} \quad (8)$$

$$\theta(k) = [b0\,br1\,br2\,br3\,br4\,s0\,s1\,s2] \quad (9)$$

$$\xi^\gamma(k) = [u(k)u(k-1)u(k-2)u(k-3)u(k-4)y(k)y(k-1)y(k-2)] \quad (10)$$

The ECU 39 executes the above described model reference adaptive control according to programs shown in FIGS. 4 to 9. The processes of the programs are described hereinafter.

[Valve Timing Control]

Figure 4:
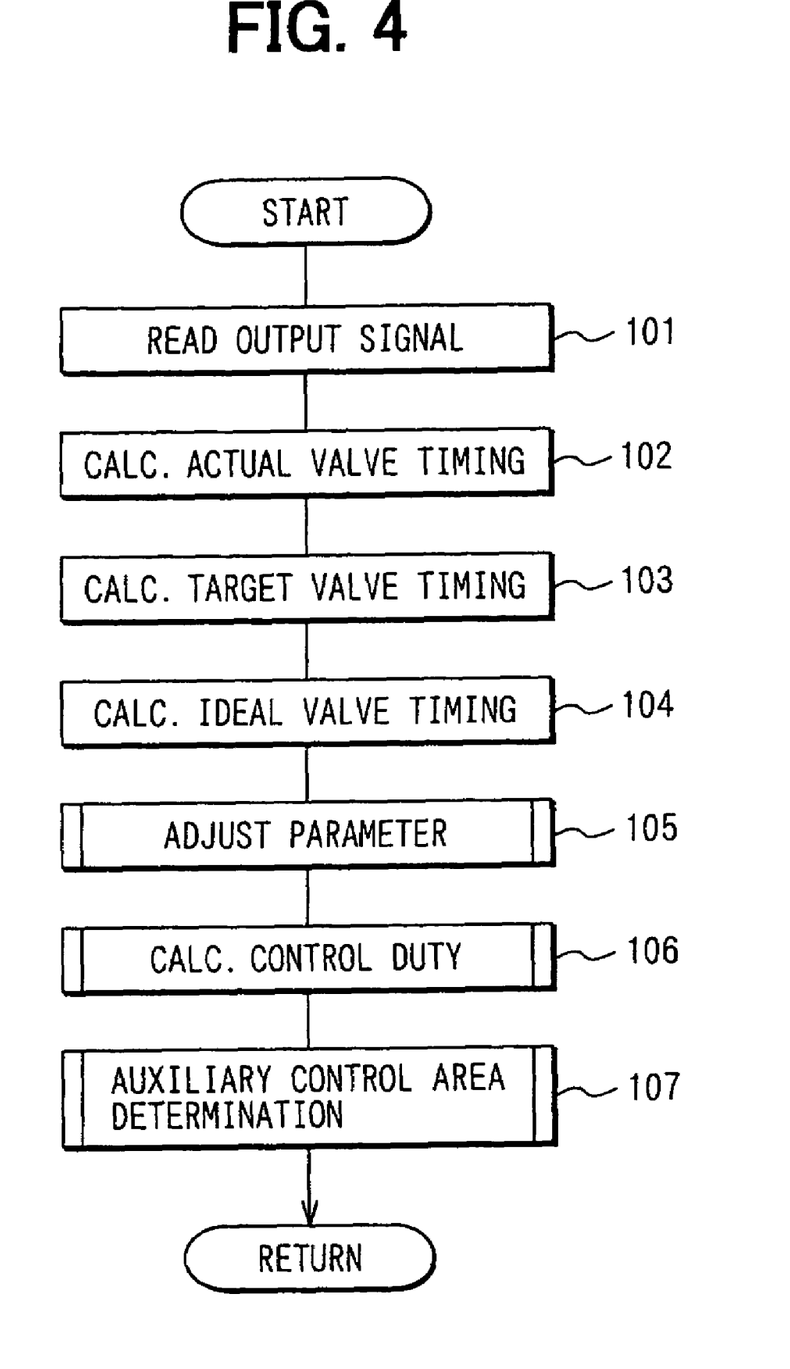
FIG. 4 is a flowchart showing a process of a valve timing control program.

A valve timing control program shown in FIG. 4 is executed at regular intervals while the engine is running. In step 101, the output signals from the cam angle sensor 37 and the crank angle sensor 38 are read.

In step 102, the actual valve timing is calculated based on the output signals from the cam angle sensor 37 and crank angle sensor 38. This step corresponds to a control output detecting means. In step 103, the target valve timing is calculated based on a driving condition of the engine.

In step 104, the output of the reference model 40 with respect to the target valve timing is calculate according to the equation (2) such that ideal valve timing track is calculated.

Figure 5:
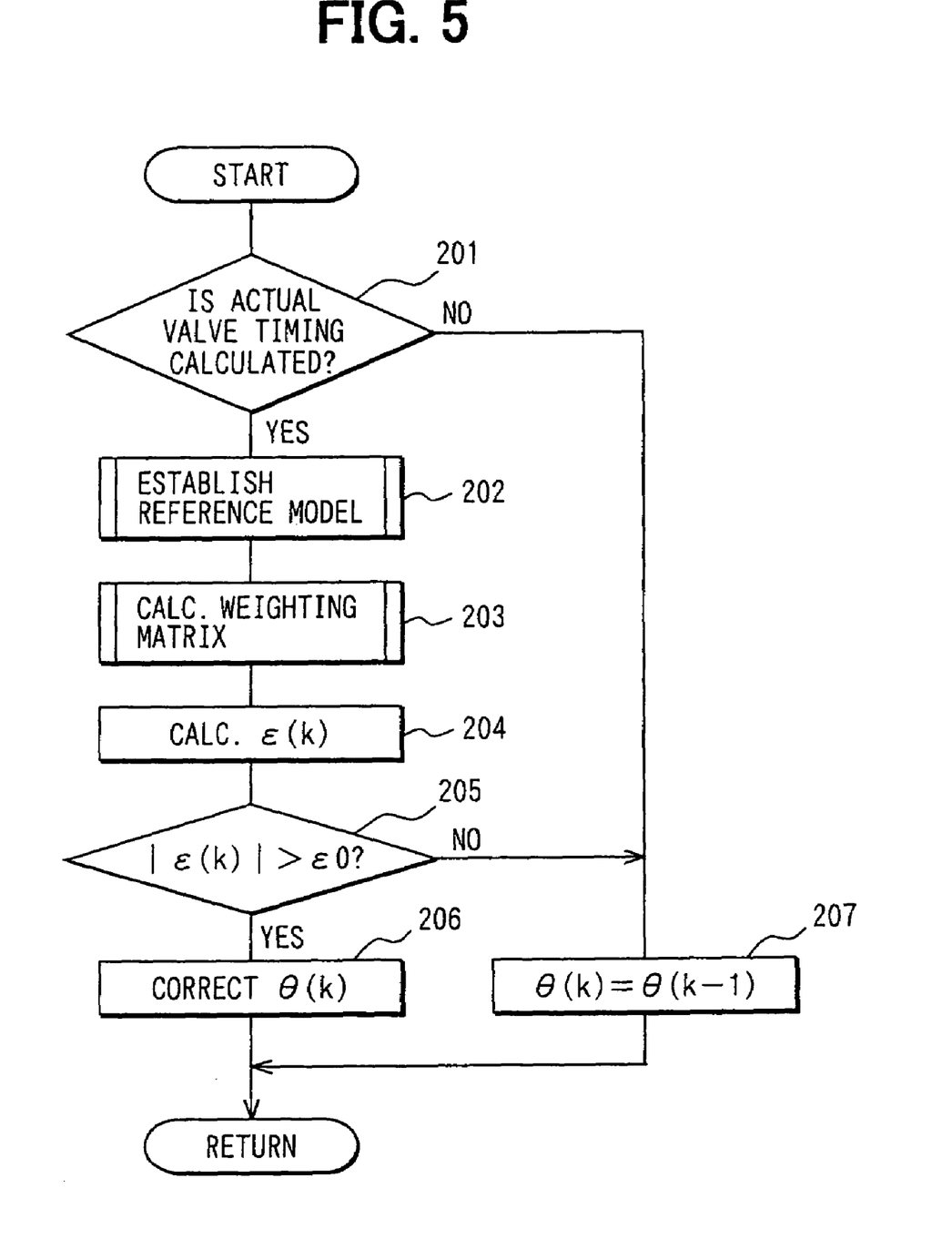
FIG. 5 is a flowchart showing a process of a parameter consecutive adjusting program.

In step 105, a parameter consecutive adjusting program shown in FIG. 5 is executed in a sampling period of the actual valve timing (execution period of the program) such that a parameter θ (k) of the controller 41 is adjusted to make the difference between the output of the reference model 40 and the actual valve timing small enough.

Figure 8:
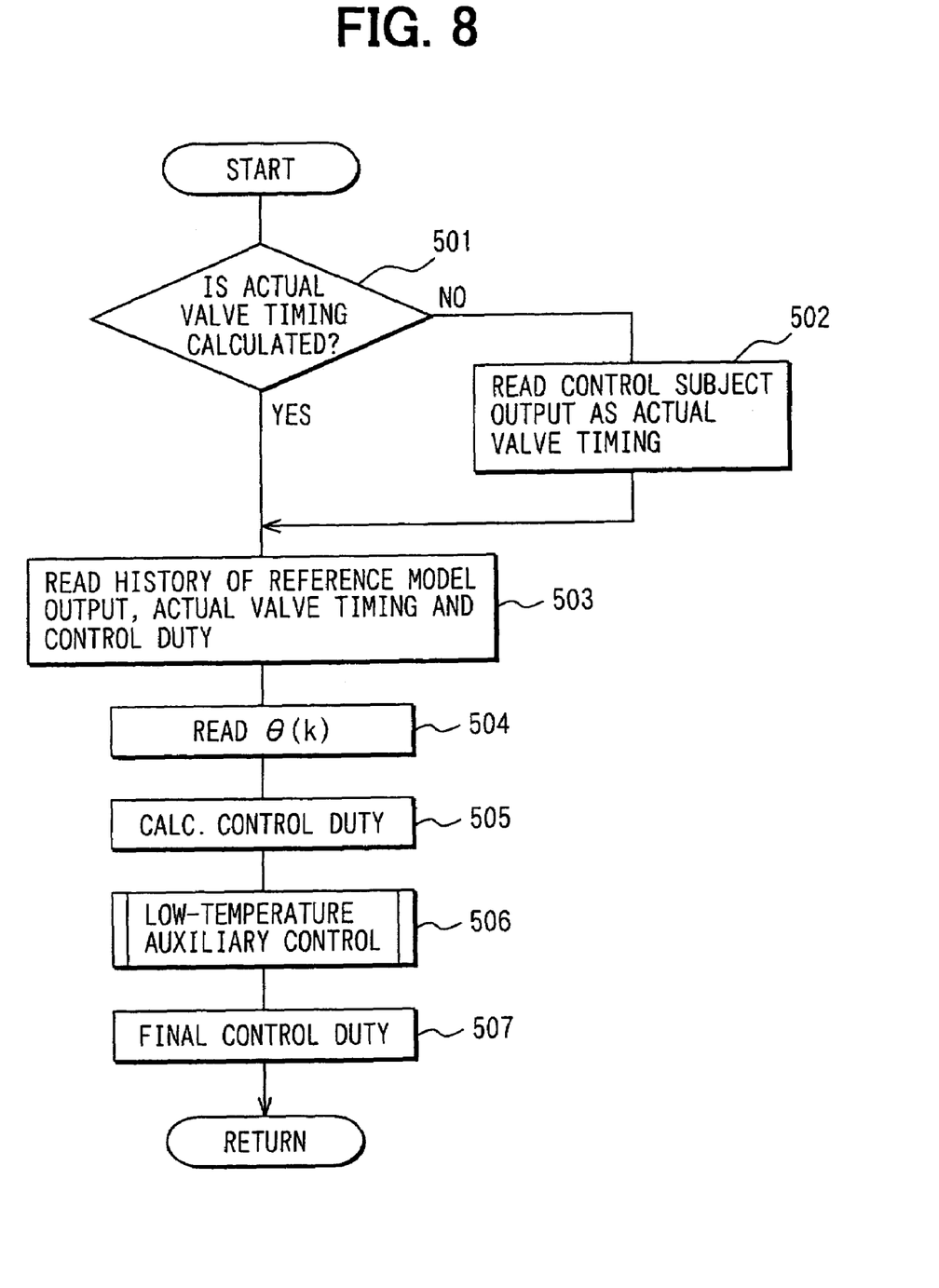
FIG. 8 is a flowchart showing a process of a control input calculating program.

In step 106, a control input calculating program shown in FIG. 8 is executed to calculate a control duty in such a manner that a difference between the output of the reference model 40 and the actual valve timing becomes zero. In step 107, an auxiliary control area determination program (not shown) is executed to determine whether it is in an auxiliary control area, and then the program ends.

[Parameter Consecutive Adjusting]

A process of the parameter consecutive adjusting program shown in FIG. 5 is described hereinafter. This program is executed in step 105 of the valve timing control program shown in FIG. 4. In step 201, a determination is made as to whether a skip reading of the actual valve timing exists, the actual valve timing being calculated based on outputs from the cam angle sensor 37 and the crank angle sensor 38.

When it is determined that the skip reading of the actual valve timing exists (that is, the actual valve timing is not detected in the execution interval), the procedure proceeds to step 207 to maintain the previous parameter θ (k−1) as the present parameter θ (k) of the controller 41.

When it is determined that the skip reading of the actual valve timing does not exist in step 201, the process as to the parameter adjusting is conducted as follows. In step 202, a reference model establishing program is executed to calculate each parameter of the reference model 40 and establish the reference model 40.

Figure 7:
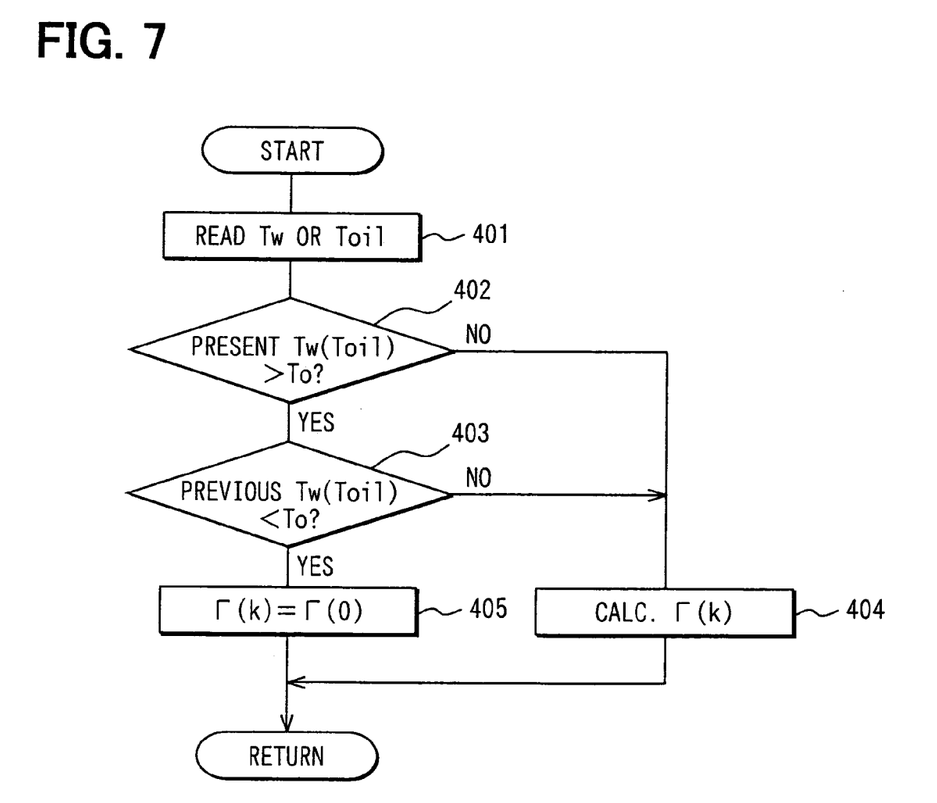
FIG. 7 is a flowchart showing a process of a weighting matrix calculating program.

In step 203, a weighting matrix calculating program shown in FIG. 7 is executed to calculate a weighting matrix Γ (k).

In step 204, a difference ε (k) between the output of the reference model 40 and the actual valve timing is calculated. And then, the procedure proceeds to step 205 in which a determination is made as to whether an absolute value of the difference ε (k) is greater than a predetermined value ε0. The predetermined value ε0 corresponds to a value of allowable error.

When it is determined that the absolute value of the difference ε (k) is greater than the predetermined value ε0, the procedure proceeds to step 206 in which the parameter θ (k) of the controller 41 is corrected in such a manner that the difference ε (k) becomes small enough.

When it is determined that the absolute value of the difference ε (k) is less than or equal to the predetermined value ε0 in step 205, the correction of the parameter θ (k) of the controller 41 is terminated and the procedure proceeds to step 207 in which the previous value θ (k−1) is maintained as the present value θ (k).

[Establishment of Reference Model]

Figure 6:
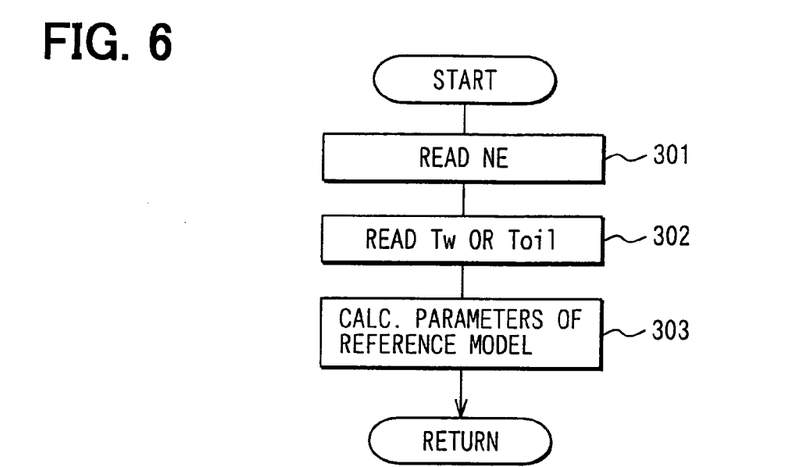
FIG. 6 is a flowchart showing a process of a reference model establishing program.

In the reference model establishing program shown in FIG. 6, which is executed in step 202 in FIG. 5, the computer reads the engine speed NE detected by crank angle sensor 38. In step 302, the computer reads the coolant temperature detected by the coolant temperature sensor 25. The computer may reads the oil temperature detected by the oil temperature sensor.

Then, the procedure proceeds to step 303 in which each parameter am1, am2, bm, bm1, bm2 of the reference model corresponding to the current coolant temperature Tw (or the oil temperature Toil) and the engine speed NE are calculated by means of a map. Thus, a suitable reference model 40, which is based on the current water temperature (or the oil temperature) and the engine speed NE.

[Calculation of Weighting Matrix]

In a weighting matrix calculation program shown in FIG. 7, which is executed in step 203 of FIG. 5, the computer reads the coolant temperature Tw (or the oil temperature Toil) in step 401, and then a determination is made as to whether the current coolant temperature Tw (or the oil temperature Toil) is higher than a predetermined value T. In step 403, a determination is made as to whether the previous value of the coolant temperature Tw (or the oil temperature Toil) is higher than a predetermined value T0. The present values T, T0 are set as one of a plurality of values, for example, 0° C., 30° C., 60° C.

When the answer is "No" at least in step 402 or step 403, the procedure proceeds to step 404 in which the weighting matrix is calculated according to the equation (7).

Then, when the answer is "Yes" in both step 402 and step 403, that is, only when the coolant temperature (or the oil temperature) exceeds the predetermined value T (for example, 0° C., 30° C., or 60° C.), the procedure proceeds to step 405 in which the weighting matrix $\Gamma$ (k) is reset as initial value $\Gamma$ (0). The parameter $\theta$ (k) is maintained the precious value which is utilized as the initial value.

[Calculation of Control Input]

The process of control input calculating program shown in FIG. 8 is described hereinafter, which is executed in step 106 of the valve timing control program shown in FIG. 4. In step 501, a determination is made as to whether the skip of the actual valve timing, which is calculated based on the outputs from the cam angle sensor 37 and the crank angle sensor 38, exists or not.

When it is determined that the skip reading exists, that is, when the actual valve timing is not detected in a execution period of the program, the procedure proceeds to step 502 in which the output of the control subject model expressed by the equation (1) (or the output of the reference model 40) are read as a substitute for the actual valve timing. Then, the procedure proceeds to step 503.

When it is determined that no skip reading exists, the procedure proceeds to step 503.

In step 503, a history of the output of the reference model 40, the actual valve timing, and the control duty are read. In step 504, the parameter $\theta$ (k) of the controller 41, which is established in the parameter consecutive adjusting program shown in FIG. 5, are read.

Then, the procedure proceeds to step 505 in which the control duty is calculated such that the difference between the output of the reference model 40 and the actual valve timing. In step 506, a low-temperature auxiliary control program shown in FIG. 9 is executed, and then a final control duty is determined in step 507.

[Low-Temperature Auxiliary Control Program]

Figure 9:
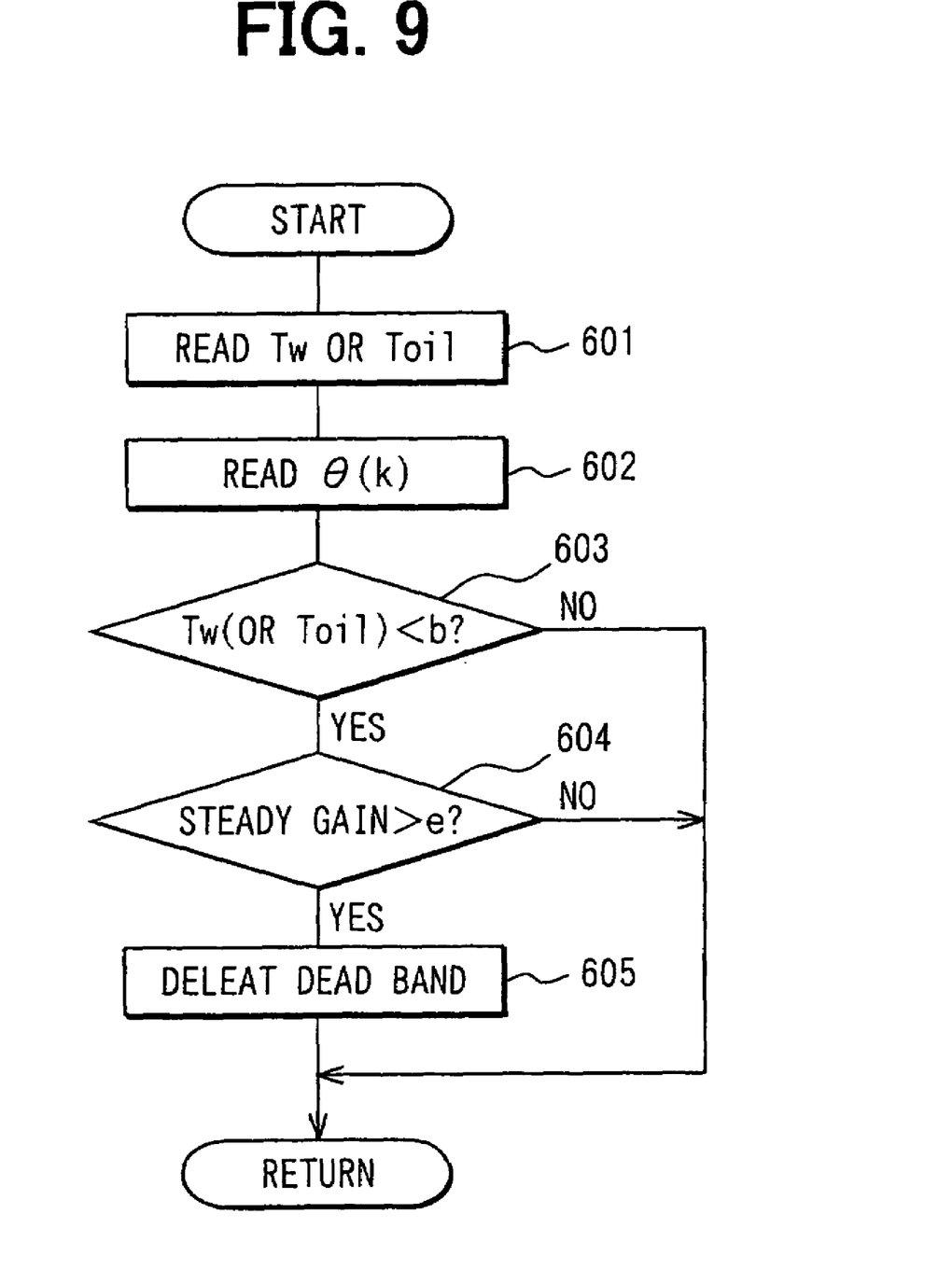
FIG. 9 is a flowchart showing a process of a low-temperature auxiliary control program.

In the low-temperature auxiliary control program shown in FIG. 9, which is executed in step 506 of FIG. 8, the coolant temperature Tw (or the oil temperature Toil) are read in step 601. In step 602, the parameter $\theta$ (k) of the controller 41 established in the parameter consecutive adjusting program shown in FIG. 5 is read.

Then, a determination is made as to whether the coolant temperature Tw (or the oil temperature Toil) is smaller than a predetermined value "b" in step 603. In step 604, a determination is made as to whether a steady gain of the parameter $\theta$ (k) of the controller 41 is larger than a predetermined value "e".

When the answer is "No" at least in step 603 or step 604, the procedure ends without executing a dead band deleting control (step 605).

When the answer is "Yes" in both step 603 and step 604, that is, when it is in a low-temperature condition and it is determined that the steady gain of the parameter $\theta$ (k) of the controller is larger than the predetermined value "e", it is determined that it is in the dead band in which no linearity exists in the characteristic of the variable valve timing 32, so that the procedure proceeds to step 605 in which a dead band delete control is executed. In the dead band delete control, the variable valve timing controller 32 simulately has a linearity in characteristic thereof to ensure the controlabilty thereof by inputting an auxiliary signal or adding an proper process to the control input of the variable valve timing controller 32, for example, making the control input in n-th power or taking a logarithm of the control input.

Figure 10A:
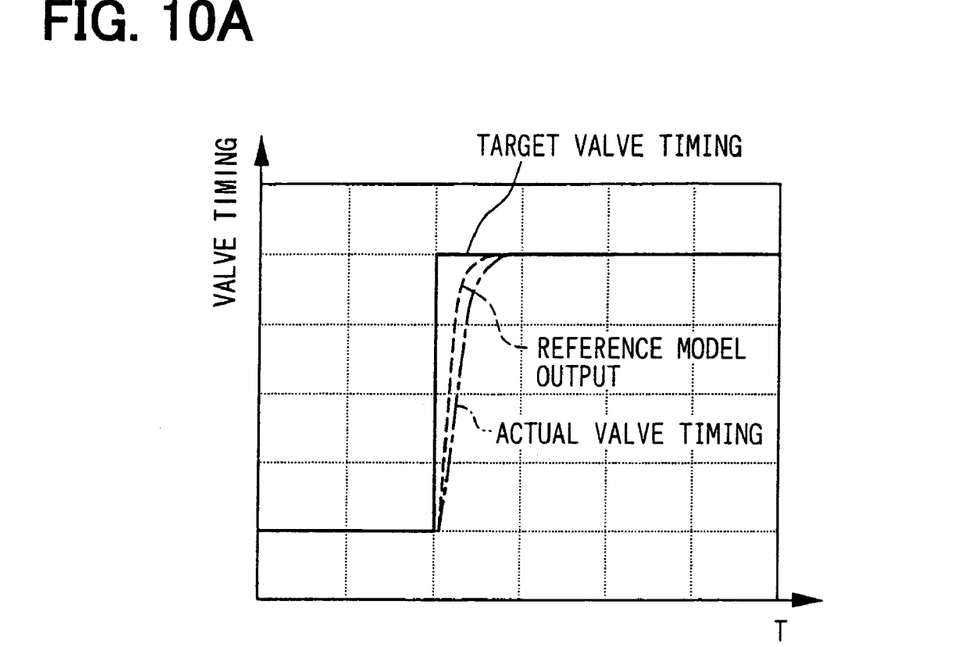
FIGS. 10A and 10B are time charts showing an embodiment of the present invention.
Figure 10B:
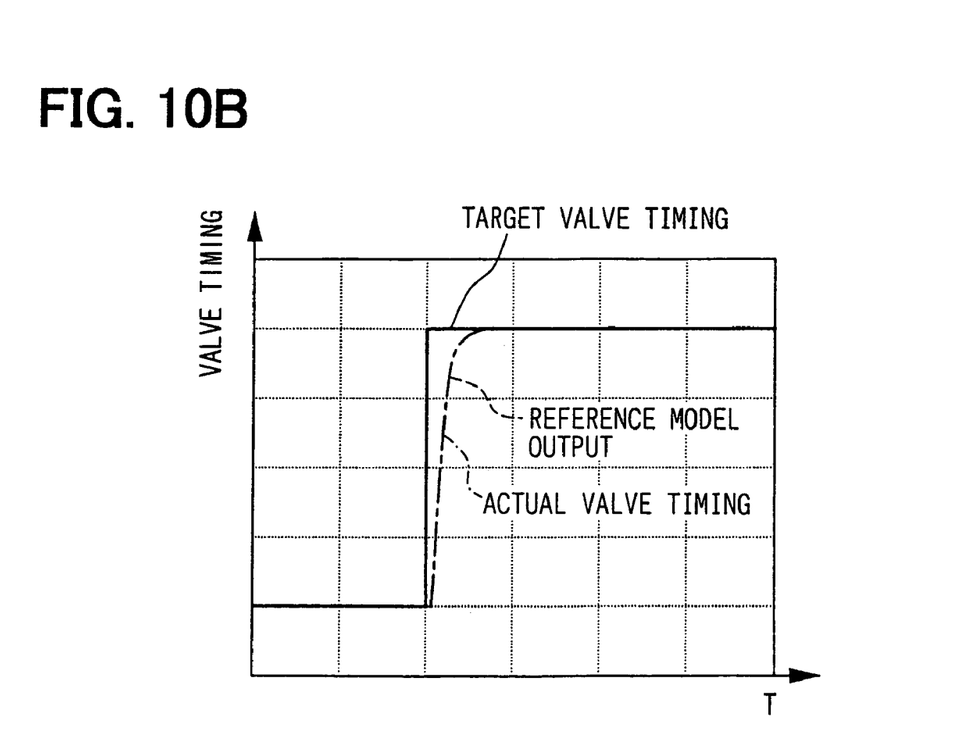

According to this embodiment, the controller 41 is structured to obtain the control duty which asymptotically make the output of the control subject model (the actual valve timing) simulating a dynamic characteristic of the variable valve timing controller 32 consistent with the output of the reference model simulating the ideal input-output characteristic of the variable valve timing controller 32. As shown in FIG. 10, when the dynamic characteristic of the variable valve timing controller 32 is varied according to a variation of an operation environment so that the difference between the output of the reference model 40 and the actual valve timing becomes larger, the parameter $\theta$ (k) of the controller 41 is consecutively adjusted to make the difference small. Thus, even if the dynamic characteristic of the variable valve timing controller due to the operation environment, the production disperse, and the aging is varied, the control duty is automatically corrected according to the variation of the dynamic characteristic of the variable valve timing controller, so that the control accuracy of the variable valve timing controller during the transient period is enhanced in order to restrict the dispersion of torque due to a dispersion of transient response of the variable valve timing controller 32.

Furthermore, since the parameter of the reference model 40 is corrected according to the coolant temperature (or the oil temperature) and the engine speed NE considering the dynamic characteristic of the variable valve timing 32 is varied according to the operation condition such as the oil temperature, the dynamic characteristic (input-output characteristic) can be varied, while the dynamic characteristic of the variable valve timing controller 32 is varied, to enhance the accuracy of the compensation of the reference model 40.

Meanwhile, when the parameter $\theta$ (k) of the controller 41 is corrected until the difference between the output of the reference model 40 and the actual valve timing becomes exactly zero, a control system may diverge erroneously learning the parameter $\theta$ (k) due to a disturbance such as a noise.

According to the present embodiment, when the difference between the output of the reference model 40 and the actual valve timing becomes smaller than a predetermined value, the consecutive correction of the parameter $\theta$ (k) is terminated. Thus, the dead band can be established in the controller 41 to restrict the erroneous learning of the parameter $\theta$ (k) due to the disturbance such as the noise and restrict the divergence of the control system.

Besides, since the parameter $\theta$ (k) is corrected in the sampling period of the actual valve timing, the parameter $\theta$ (k) can be corrected in an appropriate interval in synchronization with the sampling period of the actual valve timing. It is restricted that the parameter $\theta$ (k) is corrected in a shorter interval than an appropriate interval in order to reduce a calculation load of the ECU 39. The parameter $\theta$ (k) may be corrected in an interval which is integral multiplication of the sampling period of the actual valve timing.

Besides, in the present embodiment, when the actual valve timing is not detected in a predetermined period, the consecutive correction of the parameter θ(k) is terminated to calculate the control duty by means of the output of the control subject (or the output of the reference model 40) instead of the actual valve timing. Thus, even if the skip reading of the actual valve timing exists, the calculating operation of the control duty can be continued. By terminating the consecutive correction of the parameter θ (k), it can be restricted the erroneous learning of the parameter θ (k) due to the skip reading of the actual valve timing.

Besides, the weighting matrix Γ (k) is reset as the initial value Γ (0) when the coolant temperature Tw (or the oil temperature Toil) exceeds the predetermined value T0 (for example, 0° C., 30° C., or 60° C.), so that the parameter θ (k) and the weighting matrix Γ (k) can be established according to the current operating environment without being affected by a past parameter θ (k) and the weighting matrix Γ (k). Alternatively, the parameter θ (k) may be reset when the coolant temperature Tw (or the oil temperature Toil) exceeds the predetermined value T0. Both the weighting parameter Γ (k) and the parameter θ (k) may be reset.

When the control system is designed provided that the dynamic characteristic of the variable valve timing controller 32 has a linearity, a deterioration of accuracy cannot be avoided in an area in which no linearity exists due to a variation of the dynamic characteristic of the variable valve timing controller 32 based on a variation of the operation environment, the area, for example, being a dead band generated at a vicinity of operation starting duty of the variable valve timing controller 32 due to an increment of the viscosity of the operating oil in an extreme low temperature.

According to the embodiment, when the steady gain of the parameter θ (k) of the controller is larger than the predetermined value "e", it is determined that it is in the dead band in which no linearity exists in the input-output characteristic of the variable valve timing 32, so that a dead band delete control is executed. Thus, the variable valve timing controller 32 simulately has a linearity in characteristic thereof to ensure the controlabilty thereof.

In the above embodiment, the parameter of the controller 41 is consecutively corrected such that the difference between the output of the reference model 40 and the actual valve timing becomes small enough. The parameter of the control subject model may be consecutively corrected such that the difference between the output of the reference model 40 and the actual valve timing becomes small enough.

In the above embodiment, the consecutive correction of the parameter is terminated when the difference between the output of the reference model 40 and the actual valve timing is lower than or equal to the predetermined value. The consecutive correction of the parameter may be terminated when the difference between the actual valve timing and the output of the control subject model.

The operating environment, such as the coolant temperature, the oil temperature, and the engine speed, may be estimated based on the corrected parameter. Since the parameter is corrected according to the variation of the dynamic characteristic of the variable valve timing due to the variation of the operating environment, the corrected parameter can cause an accurate estimation of the operating environment.

Besides, the correction of the parameter may be terminated when the target valve timing (a target advance angle) is zero. The condition in which the correction of the parameter is re-executed is the time when at least one of the target valve timing and the actual valve timing is greater than the predetermined value and a holding learning value (or corresponding integrated value) is brought into close to the actual value enough.

The control requirement is different between a time when an advance control is executed and a time when a retard control is executed relative to the current valve timing. For example, since a misfire may occur due to an overshoot (over advance) in the advance control, it is required to reduce the overshoot as much as possible. On the other hand, since the valve timing is required to be returned rather than an accuracy of the valve timing control, some amount of the overshoot are acceptable compared with the advance control. From such a reason, the variable valve timing controller is generally structured in such a manner that a response in the retard control is faster than that in the advance control. If the control condition is same in both advance control and retard control, the response in advance control is not possibly so corrected that the response is kept slow, or the response in retard control is not possibly so corrected that the response is kept fast.

The variable valve timing controller may be provided with a RAM for the advance control and a RAM for the retard control so that the parameter correction may be executed when an advance control relative to the current valve timing is required, and the parameter correction may be prohibited when a retard control is required and the variation of the target valve timing is larger than a predetermined value. Thereby, both of the control requirement in advance control (prevention of the overshoot) and the control requirement in retard control (maintaining a high response) can be obtained. The condition for re-execution of the parameter correction is that a predetermined period has passed since the control requirement is changed from the retard control to the advance control, and that the holding learning (an offset by integration) has been completed.

In the above embodiment, the present invention is applied to a variable valve timing controller which controls the valve timing of the intake valve. The present invention can be applied to a variable valve controller which controls the valve lift amount and valve opening period of the intake valve, a variable valve controller which controls the valve opening/closing characteristic of the exhaust valve (at least one of a valve timing, a valve lift, and a valve opening period), or a control subject which is used in an automobile or an engine control apparatus.

In the above embodiment, the present invention is applied to a control system provided with a reference model. The present invention can be applied to another control system which calculates control inputs from a target value of the control subject according a control subject model which simulates a dynamic characteristic of the control subject.

What is claimed is:

1. A controller for an automobile comprising:
    a control input calculation means for calculating an input for a control subject from a target value of the control subject by means of a control subject model simulating a dynamic characteristic of the control subject of an automobile;
    a control input detecting means for detecting an output of the control subject; and
    a parameter correcting means for correcting either a parameter of the control subject model or a parameter of the control input calculation means based on a relationship between the input of the control subject or the target value and an output of the control subject.

2. A controller for an automobile according to claim 1, wherein the control input calculation means establishes a reference model simulating a desirable input-output characteristic of the control subject, and calculates an input of the control subject so that the difference between an output of the reference model and the output of the control subject becomes zero, the output of the reference model being obtained when the target value is inputted into the reference model.

3. A controller for an automobile according to claim 2, further comprising a reference model varying means for varying the reference model according to an operation environment of the control subject.

4. A controller for an automobile according to claim 2, wherein the parameter correcting means corrects either the parameter of the control subject or the parameter of the control input calculating means in order to reduce the difference between the output of the reference model and the output of the control subject when the difference becomes large.

5. A controller for an automobile according to claim 4, wherein the parameter correcting means terminates a correction of the parameter either when a difference between the output of the reference model and the output of the control subject is less than a predetermined value, or when a difference between the output of the control subject and the output of the control subject model is less than a predetermined value.

6. A controller for an automobile according to claim 1, wherein the parameter correcting means corrects the parameter in a sampling period of the output of the control subject or in an integral multiple of the sampling period.

7. A controller for an automobile according to claim 1, further comprising an estimating means for estimating an operating environment of the control subject based on the parameter corrected by the parameter correcting means.

8. A controller for an automobile according to claim 1, further comprising a control means for terminating a correction of the parameter by the parameter correcting means and controls the control subject by means of the control subject model or an output of a reference model instead of outputs from sensors when no output of the control subject is detected in a predetermined period by the control output detecting means.

9. A controller for an automobile according to claim 1, further comprising an auxiliary control means for executing an auxiliary control in which the input of the control subject is corrected according to a variation of the dynamic characteristic of the control subject when the dynamic characteristic of the control subject is varied due to a variation of the operating environment of the control subject.

10. A controller for an automobile according to claim 1, wherein the control subject is a variable valve controller adjusting an opening/closing characteristic of an intake valve or an exhaust valve of an internal combustion engine with a hydraulic pressure.

* * * * *